Dec. 26, 1939.     H. T. KRAFT     2,184,927
PNEUMATIC TIRE
Filed March 29, 1937

INVENTOR
Herman T. Kraft
BY Evans & McCoy
ATTORNEYS

Patented Dec. 26, 1939

2,184,927

UNITED STATES PATENT OFFICE 2,184,927

PNEUMATIC TIRE

Herman T. Kraft, Akron, Ohio, assignor to The General Tire & Rubber Company, Akron, Ohio, a corporation of Ohio Application March 29, 1937, Serial No. 133,492

7 Claims. (Cl. 152—209)

This invention relates to pneumatic tires, and particularly to pneumatic tires having a tread portion formed of closely spaced, laterally flexible ribs that are of greater depth than width and that extend continuously around the tire without interruption over a major portion of the tread surface of the tire casing. A tire of this general character is described and claimed in Kraft Patent No. 2,048,635 granted July 21, 1936 and is a continuation in part of my copending application Serial No. 128,937 filed March 4, 1937.

In tires of the endless flexible rib type it is desirable that the ribs carry the load during normal operation without substantial lateral flexing since lateral wiping movements of the ribs on the road surface tend to wear away the tips of the ribs. The portions of the ribs engaging the ground are under pressure and as the tire rolls there is a compression wave in the rubber immediately in advance of the ground contact area. This compression wave has a tendency to cause the ribs to flex laterally and increases the abrasion upon the tips of the ribs during normal operation. The present invention has for an object to provide a tire in which the circumferential ribs are stretched and put under tension upon inflation of the tire so that the compression created at the zone of contact is instantly absorbed by the tensioned ribs ahead of the zone of contact so that there is no lateral flexing of the ribs due to the compression wave.

A further object of the invention is to provide a tire in which the stresses are so distributed upon inflation of the tire that the wiping action of the ribs adjacent the tire shoulders and the wear on the shoulder ribs are greatly reduced.

With the above and other objects in view the invention may be said to comprise the device as shown in the accompanying drawing hereinafter described and particularly set forth in the appended claims together with such variations and modifications thereof as will be apparent to one skilled in the art to which the invention appertains.

A preferred embodiment of my invention is shown in the accompanying drawing wherein Figure 1 is a fragmentary cross-sectional perspective view showing a tire casing embodying the invention;

Figure 1:
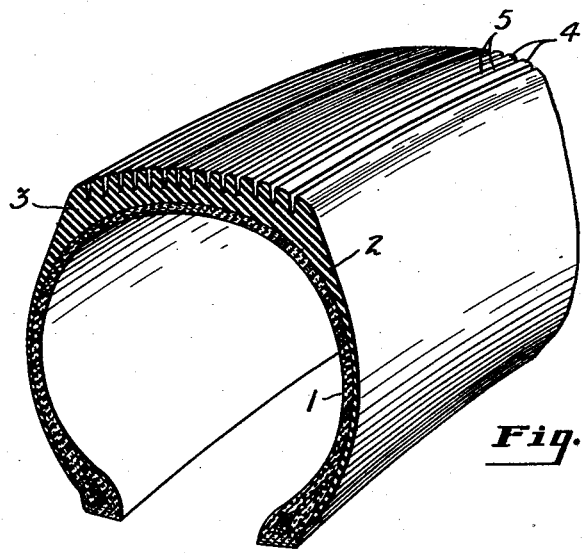

The tire casing shown in the accompanying drawing comprises a fabric carcass 1 and a rubber covering 2 thickened over the peripheral portion of the casing to provide a tread portion 3. The tread portion 3 has closely spaced endless circumferential ribs 4 which are of greater depth than width. The width of the grooves 5 between successive ribs is preferably not more than one-third the width of the ribs at their outer edges. Closely spaced narrow circumferential ribs such as herein shown provide excellent slip-resisting traction elements which operate normally without excessive distortion but which are distorted by lateral thrusts or the increased drag due to application of the vehicle brakes.

It has been found that the rate of wear on the rib tips may be materially reduced if the rubber of the ribs is maintained in a stretched condition and under tension during operation. The improvement in wearing qualities of the ribs is believed to be due to the lessening of the tendency of the ribs to flex laterally immediately ahead of the area of contact with the road surface due to the compression of portions of the ribs engaging the ground, which creates a pressure wave in the rubber ribs in advance of the portions of the tread engaging the ground. When the ribs are under tension they act like stretched rubber bands continuously absorbing the pressure wave. In tires in which the ribs are not under tension pressure in a circumferential direction tends to flex the rib laterally. When the rib is under tension, a circumferentially acting pressure merely relieves a part of the tension and does not tend to flex the rib laterally.

In tires of the type covered by my patent above referred to, it has been found that when the tire is molded to round cross-section the ribs adjacent the tire shoulders tend to wear more rapidly than the central ribs. This is believed to be due to unequal distribution of the pressure against a road surface, the major portion of the load being imposed upon the centrally disposed ribs and the flexing of the tread causing the side ribs which engage the road surface with relatively slight pressure to wipe laterally on the road surface, and this wiping action causes more rapid abrasion. The present invention so distributes the stresses across the face of the tread that the side ribs of the tire are subjected to a substantial portion of the load and have a more extended contact with the road surface so that they do not slip as much on the road surface and are not abraded as rapidly.

In order to put the ribs 4 under tension the tire casing is molded with its periphery transversely flattened so that internal air pressure will force the tread outwardly and increase the diameter thereof, stretching the endless circumferential ribs and putting them under tension.

Figure 2:
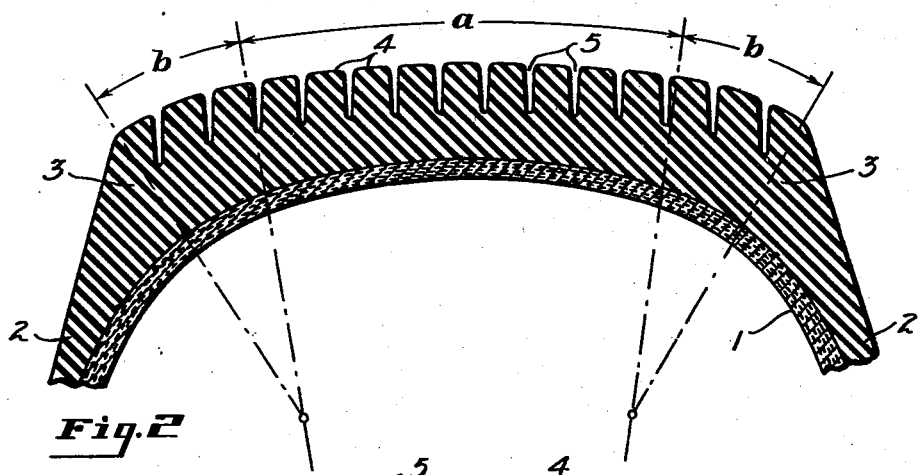
Fig. 2 is a transverse cross-section of the tire casing shown in Fig. 1 showing the contour to which the casing is molded.
Figure 3:
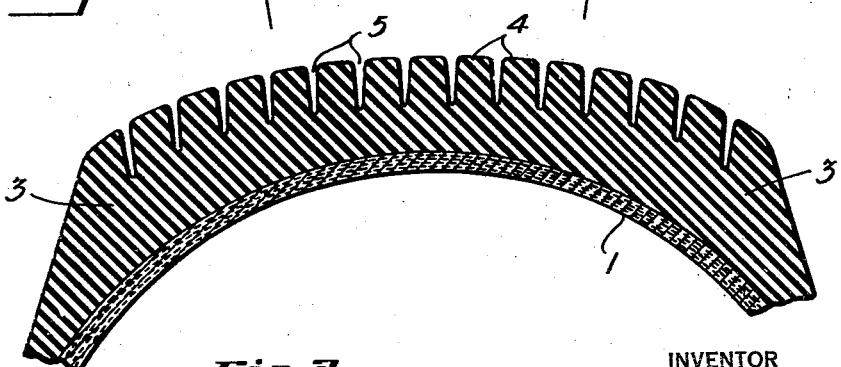
Fig. 3 is a transverse cross-sectional view of the tire shown in Figs. 1 and 2 showing the contour thereof when inflated.

The form to which the tread portion of the tire is preferably molded and vulcanized is shown in Fig. 2, wherein the central segment a comprising the major portion of the width of the tread is formed to a radius of curvature considerably greater than the radius of curvature of the inflated tire shown in Fig. 3, and the shoulder segments b are curved to a relatively short radius of curvature. The radius of curvature of the segment a which comprises about three-fourths of the width of the tread is about four times the radius of curvature of the shoulder portions b.

For example, in a tire of seven inch internal diameter upon inflation, the radius of curvature of the central segment a may be about 11 inches and the radius of curvature of the shoulder segments b may be about 2½ inches. The transverse diameter of the uninflated tire is slightly greater than 7 inches, so that upon inflation the entire tread is expanded, the tension in the ribs due to expansion of the tread being progressively greater from the shoulders to the center of the tread.

It has been found that, in addition to the improved wearing qualities, tires constructed in accordance with the present invention are more quiet in operation.

Furthermore, it is to be understood that the particular form of tire shown and described, and the particular procedure set forth, are presented for purposes of explanation and illustration and that various modifications of said tire and procedure can be made without departing from my invention as defined in the appended claims.

What I claim is:

1. A pneumatic tire having a tread the major portion of which is composed of narrow, closely spaced flexible and elastic circumferential ribs which are of greater height than width, the tread portion of said tire having a radius of transverse curvature throughout the major portion of its width materially greater than the radius of transverse curvature of the tire when inflated, whereby the elastic circumferential ribs are stretched and put under tension upon inflation of the tire.

2. A pneumatic tire having a tread the major portion of which is composed of narrow, closely spaced flexible and elastic circumferential ribs which are of greater height than width, the tread portion of said tire having a radius of transverse curvature throughout the major portion of its width materially greater than the radius of transverse curvature of the tire when inflated, the shoulder portions of said tire having a radius of transverse curvature materially less than that of the tire when inflated.

3. A tire casing comprising a plurality of closely spaced endless tread ribs of greater depth than width and spaced less than one-third the transverse width of said ribs and having a tread surface contour over the central three-fourths portion of the tread width of about four times the transverse radius of the shoulder portions of said tire casing.

4. A tire casing having a tread portion comprising closely spaced endless circumferential ribs of greater depth than width and spaced by grooves of a width less than one-third the width of the ribs, the tread portion of said tire casing when uninflated being of less external diameter and of less curvature across the major portion of its width than when the tire is inflated whereby the endless circumferential ribs throughout the major portion of the width of the tread are under tension when the tire is inflated.

5. A tire having an elastic tread formed with ribs and intervening channels, said ribs being deeper than they are wide, the channels being deeper than they are wide, the ribs being deeper than the channels are wide, and the ribs being wider than said channels, said elastic tread, in the normal condition of the tire, being stretched and under tension, so that under load, the road-contacting portion of said tread will contract circumferentially to or toward neutral tension.

6. A tire having an elastic rubber tread formed with ribs and intervening channels, said ribs being deeper than they are wide, the channels being deeper than they are wide, the ribs being deeper than the channels are wide, and the ribs being wider than said channels, the rubber of said tread, in the normal condition of the tire, being stretched and under tension, so that under load, the road-contacting portion of the rubber of said tread will be contracted circumferentially to or toward neutral tension.

7. A tire having an elastic tread formed with ribs and intervening channels, said ribs being deeper than they are wide, the ribs being deeper than the channels are wide, and the rigs being wider than said channels, said elastic tread, in the normal condition of the tire, being stretched and under tension, so that under load, the road-contacting portion of said tread will contract circumferentially to or toward neutral tension, said rubber tread being vulcanized to the tire proper and said channels and ribs being entirely within the applied tread and the ribs being an integral part of the latter.

HERMAN T. KRAFT.